(12) United States Patent
Nakanishi et al.

(10) Patent No.: US 10,916,780 B2
(45) Date of Patent: Feb. 9, 2021

(54) MEMBRANE ELECTRODE GAS DIFFUSION LAYER ASSEMBLY AND MANUFACTURING METHOD THEREOF

(71) Applicant: Toyota Jidosha Kabushiki Kaisha, Toyota (JP)

(72) Inventors: Junji Nakanishi, Kasugai (JP); Tadashi Kawamoto, Nisshin (JP); Yuta Ikehata, Toyota (JP); Kyoko Tsusaka, Nagakute (JP); Takashi Asano, Nagakute (JP); Naoki Hasegawa, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 233 days.

(21) Appl. No.: 15/962,242

(22) Filed: Apr. 25, 2018

(65) Prior Publication Data

US 2018/0323441 A1    Nov. 8, 2018

(30) Foreign Application Priority Data

May 2, 2017    (JP) ................................. 2017-091497

(51) Int. Cl.
*H01M 4/88*    (2006.01)
*H01M 4/86*    (2006.01)
(Continued)

(52) U.S. Cl.
CPC ....... *H01M 4/8807* (2013.01); *H01M 4/8605* (2013.01); *H01M 4/8642* (2013.01); *H01M 4/8657* (2013.01); *H01M 4/8663* (2013.01); *H01M 8/1004* (2013.01); *H01M 2004/8684* (2013.01); *H01M 2004/8689* (2013.01); *H01M 2008/1095* (2013.01)

(58) Field of Classification Search
CPC .................................................... H01M 8/1004
See application file for complete search history.

(56) References Cited

U.S. PATENT DOCUMENTS

2012/0225367 A1    9/2012    Tsubosaka et al.
2014/0141353 A1*   5/2014    Huston ............... H01M 8/0236
                                                        429/479

(Continued)

FOREIGN PATENT DOCUMENTS

CN    105514465 A    4/2016
CN    105934843 A    9/2016
(Continued)

*Primary Examiner* — Brian R Ohara
(74) *Attorney, Agent, or Firm* — Dinsmore & Shohl LLP

(57) ABSTRACT

A membrane electrode gas diffusion layer assembly for a fuel cell includes a membrane electrode assembly including an electrolyte membrane, an anode catalyst layer, and a cathode catalyst layer, an anode diffusion layer joined to the anode catalyst layer of the membrane electrode assembly, and a cathode diffusion layer joined to the cathode catalyst layer of the membrane electrode assembly, in which at least one of the anode diffusion layer and the cathode diffusion layer includes a microporous layer that makes contact with the membrane electrode assembly, the microporous layer contains a cerium compound, and at least one of the electrolyte membrane, the anode catalyst layer, and the cathode catalyst layer comprises cerium ions.

6 Claims, 5 Drawing Sheets

(51) Int. Cl.
*H01M 8/1004* (2016.01)
*H01M 8/1018* (2016.01)

(56) References Cited

U.S. PATENT DOCUMENTS

2016/0104905 A1\* 4/2016 Nakanishi ........... H01M 4/8657
                                                              429/481
2016/0293987 A1\* 10/2016 Okuyama ........... H01M 4/9008
2018/0013159 A1    1/2018 Wakabayashi et al.

FOREIGN PATENT DOCUMENTS

| | | |
|---|---|---|
| JP | 2006260811 A | 9/2006 |
| JP | 2006261004 A | 9/2006 |
| JP | 2007188706 A | 7/2007 |
| JP | 5223849 B2 | 6/2013 |
| JP | 2016081630 A | 5/2016 |
| WO | 2015108193 A1 | 7/2015 |
| WO | 2016163322 A1 | 10/2016 |

\* cited by examiner

MEMBRANE ELECTRODE GAS DIFFUSION LAYER ASSEMBLY AND MANUFACTURING METHOD THEREOF

CROSS-REFERENCE TO RELATED APPLICATION

The present application claims priority to Japanese Patent Application No. 2017-091497 filed on May 2, 2017, the entire contents of which are hereby incorporated by reference into this application.

BACKGROUND

Field

The present disclosure relates to a technology for a membrane electrode gas diffusion layer assembly for a fuel cell.

Related Art

Conventionally, there is known a technology in which a membrane electrode gas diffusion layer assembly, which includes a membrane electrode assembly and diffusion layers each joined to either side of the membrane electrode assembly, is impregnated with a cerium atom (for example, a cerium compound) in an electrolyte membrane thereof in order to suppress breakdown of the electrolyte membrane (see, for example, JP 2007-188706A).

In a conventional membrane electrode gas diffusion layer assembly, the diffusion layer may include a microporous layer that comes into contact with the membrane electrode assembly (more specifically, a catalyst layer). The microporous layer is manufactured by applying an ink, which is formed by dispersing a material that contains a hydrophobic substance or the like in water, on a substrate of the diffusion layer, and calining the product. In this case, the time it takes to perform calination in order to dry the ink may be long, and hence there is a risk that the production rate of the membrane electrode gas diffusion layer assembly will reduce. Therefore, there has been a need for a technology that can shorten the calcination time of the microporous layer.

SUMMARY (1) According to one aspect of the present disclosure, a membrane electrode gas diffusion layer assembly for a fuel cell is provided. This membrane electrode gas diffusion layer assembly includes a membrane electrode assembly that includes an electrolyte membrane, an anode catalyst layer joined to one surface of the electrolyte membrane, and a cathode catalyst layer joined to another surface of the electrolyte membrane; an anode diffusion layer joined to the anode catalyst layer of the membrane electrode assembly; and a cathode diffusion layer joined to the cathode catalyst layer of the membrane electrode assembly, in which at least one of the anode diffusion layer and the cathode diffusion layer includes a microporous layer that makes contact with the membrane electrode assembly, the microporous layer contains a cerium compound and, at least one of the electrolyte membrane, the anode catalyst layer, and the cathode catalyst layer may contain cerium ions.

(2) According to one aspect of the present disclosure, a manufacturing method for a membrane electrode gas diffusion layer assembly for a fuel cell is provided. This manufacturing method includes the steps of (a) manufacturing a membrane electrode assembly by joining a catalyst layer to both surfaces of an electrolyte membrane; and (b) joining a diffusion layer to both surfaces of the membrane electrode assembly; in which the step (b) includes the steps of (b1) manufacturing an ink application diffusion layer substrate by applying a microporous-layer-forming-ink on a diffusion layer substrate to form a pre-calcination microporous layer on the diffusion layer substrate, the microporous-layer-forming-ink being formed by dispersing conductive particles, a dispersing agent, a hydrophobic substance, and a cerium compound in water; (b2) manufacture a diffusion layer in which a microporous layer is joined to the diffusion layer substrate by calcining the ink application diffusion layer substrate; and (b3) joining the diffusion layer to the catalyst layer in a state where the microporous layer faces the catalyst layer, in at least one of the two catalyst layers located on the both surfaces of an electrolyte membrane.

DETAILED DESCRIPTION

A. Embodiment

Figure 1:
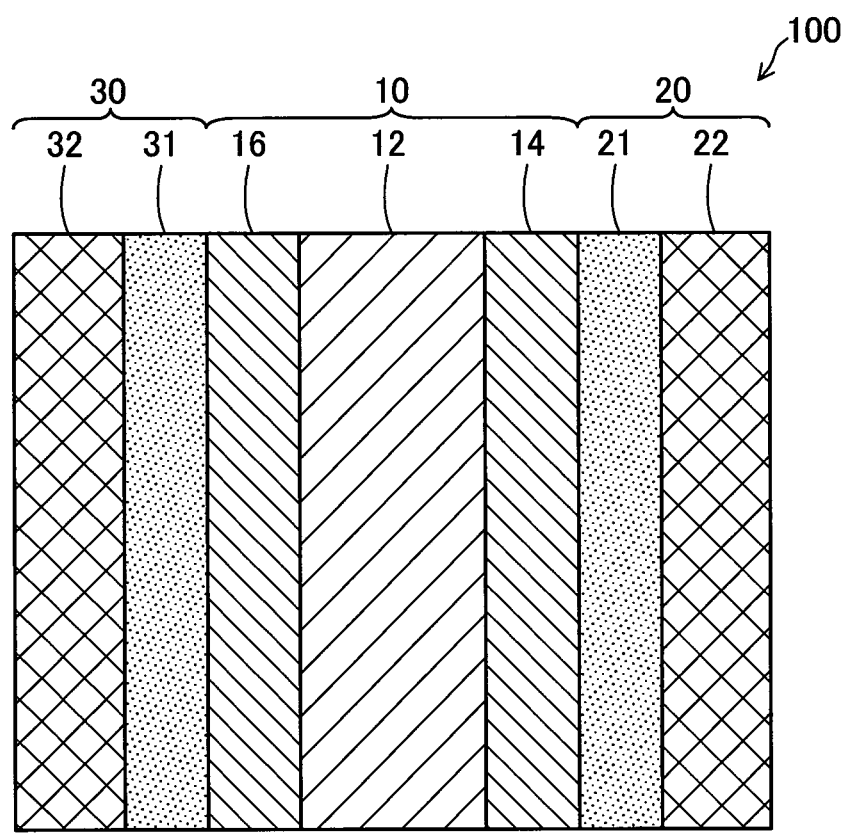
FIG. 1 is a diagram for illustrating a schematic configuration of a membrane electrode gas diffusion layer assembly (EGA) according to one embodiment of the present disclosure.

FIG. 1 is a diagram for illustrating a schematic exemplary configuration of a membrane electrode gas diffusion layer assembly (MEGA) 100 according to one embodiment of the present disclosure. FIG. 1 schematically illustrates a cross-section structure of the MEGA 100. The MEGA 100 includes a membrane electrode assembly 10, an anode diffusion layer 20, and a cathode diffusion layer 30. The MEGA 100 forms a unit cell by being sandwiched by separators that allow gas to flow. In addition, stacking a plurality of the unit cells forms a fuel cell.

The membrane electrode assembly 10 includes an electrolyte membrane 12, an anode catalyst layer 14 joined to one surface of the electrolyte membrane 12, and a cathode catalyst layer 16 joined to the other surface of the electrolyte membrane 12.

The electrolyte membrane 12 is a proton-conductive ion exchange membrane that is formed of a polymer compound, for example, a fluoride resin, and exhibits good electrical conductivity in humid environments. The electrolyte membrane 12 is formed using, for example, Nafion® fluoropolymer (registered trademark of DUPONT). The electrolyte membrane 12 is formed of a perfluorosulfonic acid polymer that has a sulfonic acid group ($-SO_3H$ group) at the side-chain terminus thereof. In addition, the $H^+$ of the sulfonic acid group at the side-chain terminus is partly ion-exchanged with cerium ions ($Ce^{3+}$). As a result, the electrolyte membrane 12 contains cerium ions. The cerium ions contained in the electrolyte membrane 12 function as a radical quencher. The thickest of the electrolyte membrane 12 is not particularly limited, and may be, for example, 20

μm or less in order to increase the functions of the electrolyte membrane 12, for example, proton deliverability.

Each of the anode catalyst layer 14 and the cathode catalyst layer 16 contains an ionomer (for example, Nafion® fluoropolymer), which is a high polymer electrolyte, and conductive substrate particles (for example, carbon particles) that support a catalyst (for example, platinum). In the anode catalyst layer 14 and the cathode catalyst layer 16, the $H^+$ of the sulfonic acid group at the side-chain terminus of the polyelectrolyte is partly ion-exchanged with cerium ions ($Ce^{3+}$). As a result, the anode catalyst layer 14 and the cathode catalyst layer 16 contain cerium ions.

In the membrane electrode assembly 10 according to this embodiment, the quantity (mol %) of cerium ions to the sulfonic acid group (sulfonic acid) is 0.1 mol % or more and 10 mol % or less. Within this range, hydrogen peroxide radicals that are generated when the fuel cell generates power can be neutralized, and the proton deliverability of the electrolyte membrane 12 can be maintained. Neutralizing the hydrogen peroxide radicals refers to, for example, reacting the hydrogen peroxide radicals with water. A manufacturing method of the membrane electrode assembly 10 is described later.

The anode diffusion layer 20 is joined to the anode catalyst layer 14 of the membrane electrode assembly 10. The anode diffusion layer 20 is a layer in which reaction gas (hydrogen gas in this embodiment) that is used in electrode reactions is dispersed along a surface direction of the membrane electrode assembly 10. The anode diffusion layer 20 also functions as a supply source that supplies cerium ions, which are used to neutralize the hydrogen peroxide radicals that are generated when the fuel cell generates power, to the electrolyte membrane 12. The anode diffusion layer 20 includes a first microporous layer 21 that makes contact with the membrane electrode assembly 10, and a first diffusion layer substrate 22 that makes contact with a surface of the first microporous layer 21 that is opposite to a side of the first microporous layer 21 on which the membrane electrode assembly 10 is located. The first microporous layer 21 contains conductive particles such as carbon particles, a water repellent agent such as polytetrafluroethylene (PTFE), and a cerium compound that acts as a supply source of cerium ions. The first microporous layer 21 is a porous layer. The first microporous us layer 21 is formed such that, for example, about 50 nm to about 100 nm holes are formed continuously in the layer in a thickness direction. The first diffusion layer substrate 22 is a porous substrate that has conducive and gas diffusion properties, for example, a carbon fiber substrate such as carbon paper, a graphite fiber substrate, and a metal foam.

The cathode diffusion layer 30 is joined to the cathode catalyst layer 16 of the membrane electrode assembly 10. The cathode diffusion layer 30 is a layer in which reaction gas (oxidized gas in this embodiment) that is used in electrode reactions is dispersed along the surface direction of the membrane electrode assembly 10. The cathode diffusion layer 30 also functions as a supply source that supplies the cerium ions, which are used to neutralize the hydrogen peroxide radicals that are generated when the fuel cell generates power, to the electrolyte membrane 12. The cathode diffusion layer 30 includes a second microporous layer 31 that makes contact with the membrane electrode assembly 10, and a second diffusion layer substrate 32 that makes contact with a surface of the second microporous layer 31 that is opposite to a side of the second microporous layer 31 on which the membrane electrode assembly 10 is located. The second microporous layer 31 contains conductive particles such as carbon particles, a water repellent agent such as polytetrafluroethylene (PTFE), and a cerium compound that acts as a supply source of cerium ions. The second microporous layer 31 is a porous layer. The second microporous layer 31 is formed such that, for example, about 50 nm to about 100 nm holes are formed continuously in the layer in a thickness direction. The second diffusion layer substrate 32 is a porous substrate that has conducive and gas diffusion properties, for example, a carbon fiber substrate such as carbon paper, a graphite fiber substrate, and a metal foam.

In an initial state (more specifically, a state before the MEGA 100 is mounted to the fuel cell and used for power generation) of the MEGA 100, a lower limit of the total cerium content (mol) in the cerium compounds in the first microporous layer 21 and the second microporous layer 31 is 10 times the quantity of cerium ions in the membrane electrode assembly 10. In addition, in the initial state of the MEGA 100, an upper limit of the total cerium content (mol) in the cerium compounds is 500 times the quantity of cerium ions in the membrane electrode assembly 10, or 100 times the quantity of cerium ions in the membrane electrode assembly 10. By setting the upper limit and lower limit to the values stated above, an appropriate quantity of cerium ions can be supplied from the cerium compounds to the membrane electrode assembly 10 during the life (from the start of use to the end of use) of the fuel cell. An "appropriate amount" is an amount at which the quantity of cerium ions in the membrane electrode assembly 10 does not become excessive. For example, an amount at which the quantity of cerium ions (mol %) to the sulfonic acid in the membrane electrode assembly 10 does not exceed 10 mol %.

Figure 2:
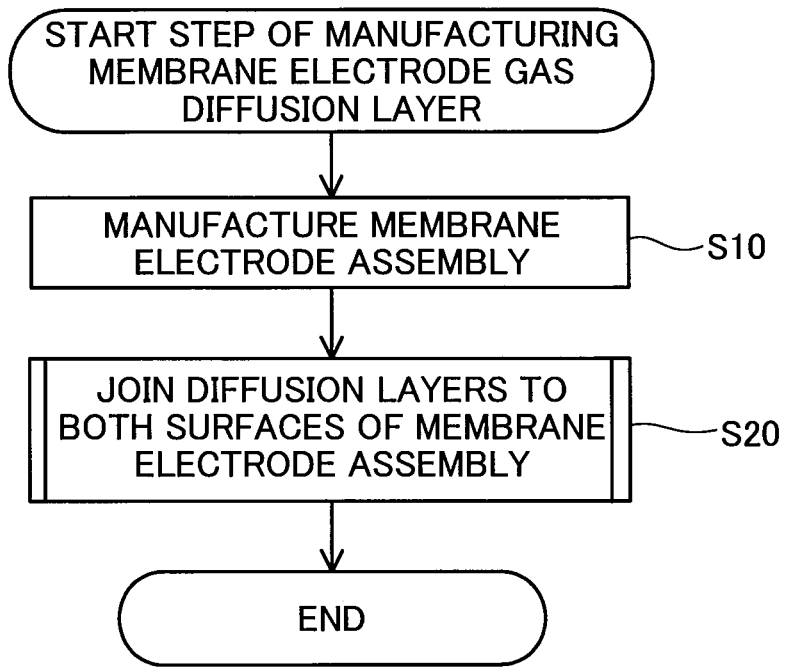
FIG. 2 is a flow chart for illustrating a manufacturing process of the MEGA.
Figure 3:
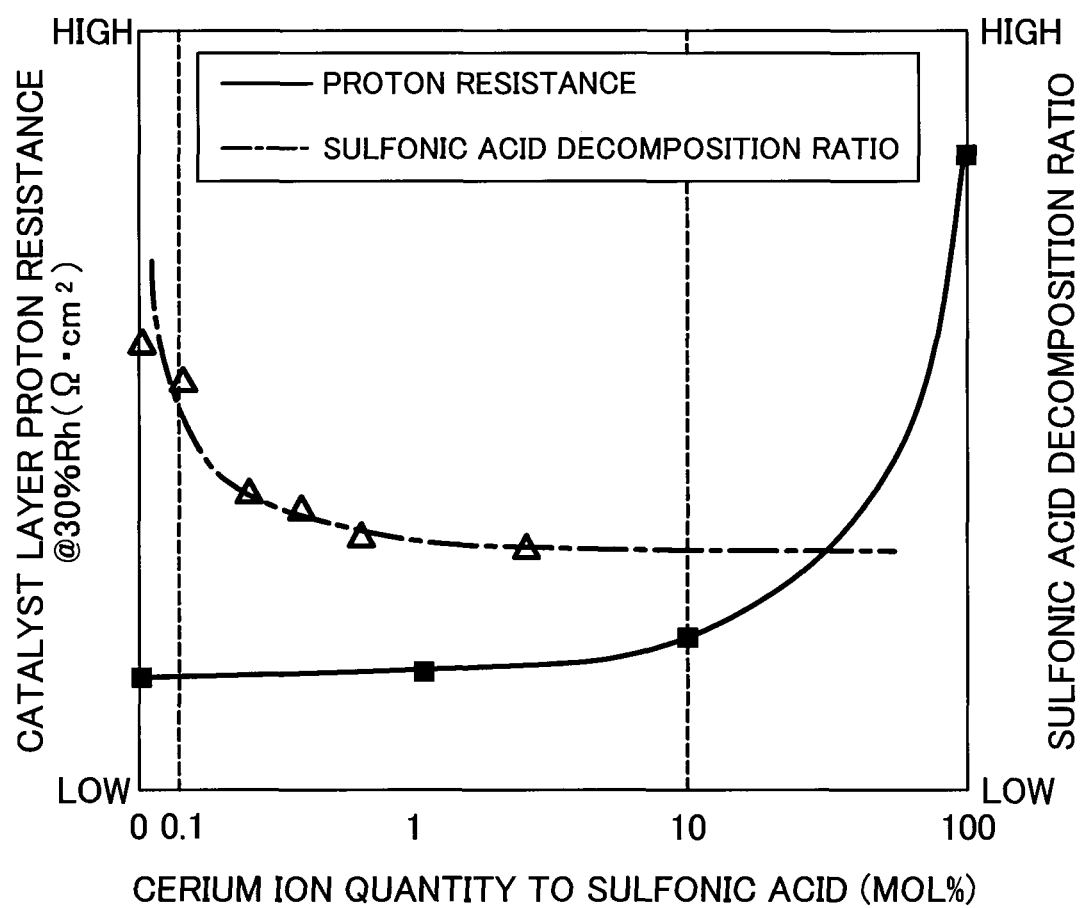
FIG. 3 is a graph for showing characteristics of a cerium ion quantity and a membrane electrode assembly.
Figure 4:
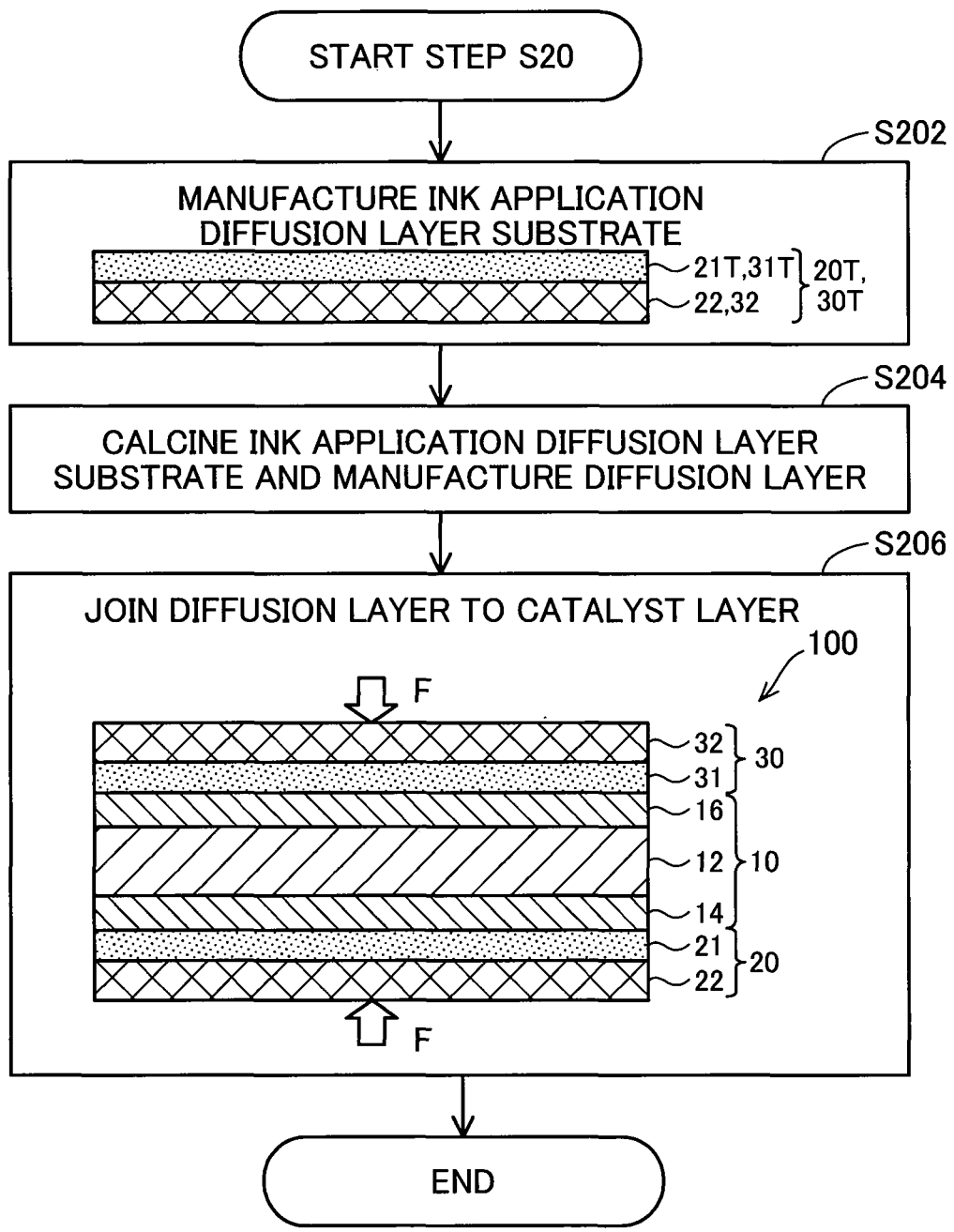
FIG. 4 is a detailed flow chart for illustrating Step S20.

FIG. 2 is a flow chart fir illustrating a manufacturing process of the MEGA 100. FIG. 3 is a graph for showing characteristics of the cerium ion quantity to sulfonic acid and the membrane electrode assembly 10. FIG. 4 is a detailed flow chart for illustrating Step S20. In FIG. 3, the vertical axis on the left represents proton resistances of the anode catalyst layer 14 and the cathode catalyst layer 16 when relative humidity of the membrane electrode assembly 10 is at 30%. The vertical axis in the right in FIG. 3 represents a sulfonic acid decomposition amount in the membrane electrode assembly 10, that is, how much of the sulfnic acid has decomposed due to the hydrogen peroxide radicals. The dotted-dashed line in FIG. 3 represents the sulfonic acid decomposition amount to the cerium ion quantity, and the solid line in FIG. 3 represents proton resistance against the cerium ion quantity. Proton resistance can be measured by, for example, frequency response analysis. The sulfonic acid decomposition amount can be measured by, for example, component analysis on the membrane electrode assembly 10.

As illustrated in FIG. 2, the membrane electrode assembly 10 is manufactured by first joining each of the catalyst layers 14 and 16 to either side of the electrolyte membrane 12 (FIG. 1) (Step S10). More specifically, the anode catalyst layer 14 is joined to one surface of the electrolyte membrane 12, and the cathode catalyst layer 16 is joined to another surface of the electrolyte membrane 12. In Step S10, catalyst ink is created by first mixing catalyst-carrying carbon, an ionomer, which is a high polymer electrolyte, and a cerium nitrate solution in a dispersion solvent (for example, water or alcohol) to emulsify those components. Then, the catalyst ink is applied to both surfaces of the electrolyte membrane 12 and dried, to thereby produce the membrane electrode assembly 10 in which the catalyst layers 14 and 16 have been assembled on either side of the electrolyte membrane 12.

In Step S10, when the catalyst ink is applied to both surfaces of the electrolyte membrane 12, some of the cerium ions in the catalyst ink move within the electrolyte membrane 12, and the $H^+$ of the sulfonic acid group of the electrolyte membrane 12 ion-exchanges with cerium ions ($Ce^{3+}$). In other words, Step S10 includes a step of impregnating the electrolyte membrane 12, the anode catalyst layer 14, and the cathode catalyst layer 16 with cerium ions. Note that, after the MEGA 100 has been mounted to the fuel cell as a constituent member of the fuel cell, even during power generation for inspection, such as performance conformation, some of the cerium ions of the cerium nitrate in the catalyst layers 14 and 16 move within the electrolyte membrane 12, and the $H^+$ of the sulfonic acid group in the electrolyte membrane is ion exchanged with cerium ions ($Ce^{3+}$).

In terms of the quantity of cerium nitrate in the catalyst ink that is prepared in Step S10, in the membrane electrode assembly 10, the quantity (mol %) of cerium ions to the sulfonic acid group (sulfonic acid) is controlled so as to be between 0.1 mol % or more and 10 mol % or less. As illustrated in FIG. 3, when the quantity of cerium ions to sulfonic acid is between 0.1 mol % or more and 10 mol % or less in the membrane electrode assembly 10, the decomposed sulfonic acid amount can be reduced, and the effect of radical quenching (neutralizing hydrogen peroxide radicals) can be sufficiently exerted. In addition, when the quantity of cerium ions to sulfonic acid is between 0.1 mol % or more and 10 mol % or less in the membrane electrode assembly 10, proton conductivity of the membrane electrode assembly 10 that includes the catalyst layers 14 and 16 can be favorably ensured.

As illustrated in FIG. 2, after Step S10, the diffusion layers 20 and 30 are joined to both surfaces of the membrane electrode assembly 10 (Step S20). Specifically, as illustrated in FIG. 4, a pre-calcination microporous layer 21T is first formed by applying microporous-layer-forming-ink, in which conductive particles, a water repellent agent, a dispersing agent, and the cerium compound are dispersed in solution, to the first diffusion layer substrate 22, for example, carbon paper. With this step, a first ink application diffusion layer substrate 20T, which is the basis of the anode diffusion layer 20, is manufactured (Step S202). In the same way, a pre-calcination microporous layer 31T is formed by applying microporous-layer-forming-ink, in which conductive particles, a water repellent agent, a dispersing agent, and the cerium compound are dispersed in solution, to the second diffusion layer substrate 32, for example, carbon paper. With this step, a second ink application diffusion layer substrate 30T, which is the basis of the cathode diffusion layer 30, is manufactured (Step S202). In this embodiment, carbon particles are used as the conductive particles, particle-shaped polytetrafluroethylene (PTFE) is used as the water repellent agent, a surfactant is used as the dispersing agent, powder cerium oxide is used as the cerium compound, and water is used as the solvent. Note that, a cerium compound other than cerium oxide, such as cerium carbonate, can be used as the cerium compound. In addition, a fluororesin other than PTFE (for example, polyvinylidene difluoride), or compound resin other than a fluororesin, such as polyethylene and polypropylene, can be used as the water repellent agent.

After Step S202, the first ink application diffusion layer substrate 20T and the second ink application diffusion layer substrate 30T are calcined in an oven at a predetermined temperature to produce the anode diffusion layer 20 and the cathode diffusion layer 30 (Step S204). More specifically, by calcining at a predetermined temperature, the microporous-layer-forming-ink that is applied to the first diffusion layer substrate 22 and the second diffusion layer substrate 32 becomes the first microporous layer 21 and the second microporous layer 31, respectively, and are joined to the first diffusion layer substrate 22 and the second diffusion layer substrate 32 to produce the anode diffusion layer 20 and the cathode diffusion layer 30, respectively. The predetermined temperature for calcining is a temperature at which or below the water repellent properties of the first microporous layer 21 and the second microporous layer 31 do not significantly decrease. The predetermined temperature may be a temperature lower than the melting point of the water repellent agent. If the water repellent properties of the first microporous layer 21 and the second microporous layer 31 significantly decrease, generated water that is generated when the fuel cell generates power pools in flow passages for the reaction gas in the first microporous layer 21 and the second microporous layer 31, and flooding can occur, which hinders the flow of the reaction gas. In addition, if the water repellent agent melts, the melted water repellent agent adheres to the area surrounding the conductive particles, which hinders the conductive particles and the ionomers in the first catalyst layer 14 and the second catalyst layer 16 from making contact with each other. As a result, tack strength between the microporous layer 21 and the anode catalyst layer 14, and the microporous layer 31 and the cathode catalyst layer 16, respectively, reduces, and the microporous layers 21 and 31 may not be able to join to the catalyst layers 14 and 16. When PTFE is used as the water repellent agent, calcination is performed at a temperature within the range of from 280° C. to 320° C. for the reasons stated above. Calination can be performed for a period of time that guarantees the moisture and dispersing agent in the microporous-layer-forming-ink sufficiently disappear (for example, until the moisture and dispersing agent are no longer present).

After Step S204, the anode diffusion layer 20 is placed on the membrane electrode assembly 10 under a state in which the first microporous layer 21 and the anode catalyst layer 14 face each other, and the cathode diffusion layer 30 is placed on the membrane electrode assembly 10 under a state in which the second microporous layer 31 and the cathode catalyst layer 16 face each other. Then, hot pressing is carried out under this state to join the anode diffusion layer 20 to the anode catalyst layer 14, and join the cathode diffusion layer 30 to the cathode catalyst layer 16 (Step S206). The condition of the hot pressing is as follows: the diffusion layers 20 and 30 (more specifically, the microporous layers 21 and 31) and the catalyst layers 14 and 16 can be joined, for example, at a temperature of 100° C., a press force F of 3 MPa, and a hot press time of 3 minutes. As described above, the MEGA 100 is manufactured by carrying out Steps S10 and S20.

Figure 5:
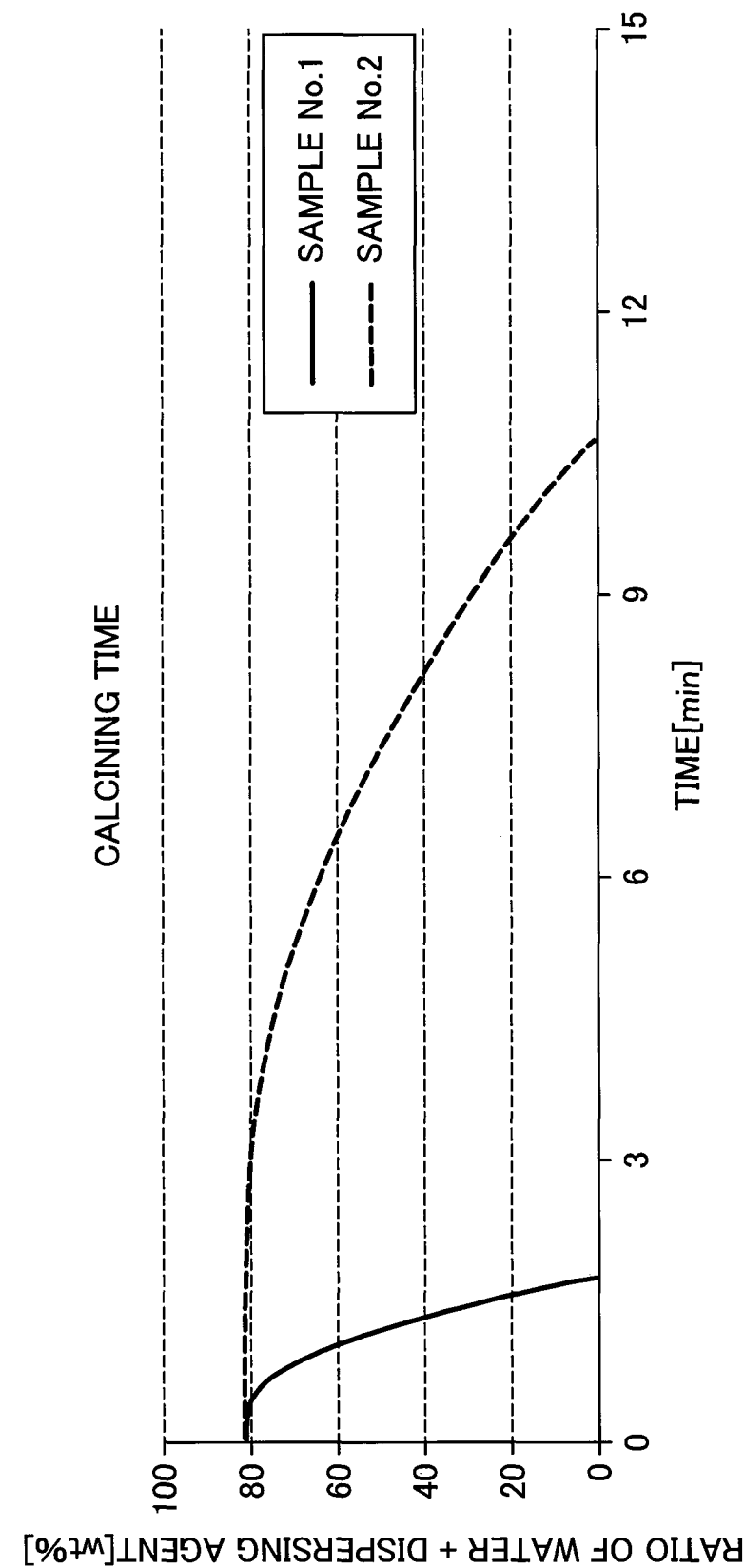
FIG. 5 is a graph for illustrating effects of the present embodiment.

FIG. 5 is a graph for illustrating effects of the present embodiment. In FIG. 5, Sample No. 1 is an ink application diffusion layer substrate according to this embodiment (for example, the first ink application diffusion layer substrate 201), and Sample No. 2 is an ink application diffusion layer substrate according to a reference example. FIG. 5 is a graph for illustrating the calcination time of the Sample No. 1 and the Sample No. 2 in Step S204 (FIG. 4). The ratio of moisture and dispersing agent (wt %) as the vertical axis of the graph is calculated by measuring the weights of the Sample No. 1 and No. 2 during calcination. The pre-calcination microporous layer 21T in the Sample No. 1 is impregnated with the cerium compound, whereas the pre-calcination microporous layer in the Sample No. 2 is not impregnated with the cerium compound.

In the Sample No. 1, the microporous-layer-forming ink that is applied to the first diffusion layer substrate 22 is composed of 1 to 10 wt % of PTFE, 1 to 30 wt % of carbon, 2 wt % of cerium compound and the remainder being a dispersing agent and water. In the Sample No. 2 the microporous-layer-forming ink that is applied to the first diffusion layer substrate 22 is composed of 1 to 10 wt % of PTFE, 1 to 30 wt % of carbon, and the remainder being a dispersing agent and water.

The ink application diffusion layer substrates of the Sample No. 1 and the Sample No. 2 are each placed in a furnace and heated at about 300° C., to thereby calcine the ink application diffusion layer substrates until the water and dispersing agent in the microporous-layer-forming-ink disappears. As illustrated in FIG. 5, the Sample No. 2, which does not contain the cerium compound in the microporous-layer-forming-ink, has a calcining time of about 10 minutes. On the other hand, the Sample No. 1, which does contain the cerium compound in the microporous-layer-forming-ink, has a calcining time of about 2 minutes, and hence the calcining time can be greatly reduced. In other words by incorporating the cerium compound in the microporous-layer-forming-ink the catalytic action of the cerium compound can burn off the dispersing agent and water, and calcining time can be reduced. With this configuration, the production rate of the anode diffusion layer 20 and the first cathode diffusion layer 30 can be prevented from being reduced.

According to the above-described embodiment, the electrolyte membrane 12, the anode catalyst layer 14, and the cathode catalyst layer 16 contain cerium ions. With this configuration, the hydrogen peroxide radicals can be neutralized with the cerium ions in a state before the cerium ions have completely moved from the microporous layer 21 to the membrane electrode assembly 10. Therefore, the electrolyte membrane 12 can be prevented from breaking down (that is, from becoming thinner) due to the hydrogen peroxide radicals.

When a fuel cell to which the MEGA 100 has been mounted is made to generate power, the cerium ions in the membrane electrode assembly 10 are gradually discharged from the system along with acidic generated water generated during power generation. With this configuration, the quantity of the cerium ions in the membrane electrode assembly 10 gradually decreases, to thereby reduce the effect of radical quenching and cause a risk of the electrolyte membrane 12 decomposing faster due to the hydrogen peroxide radicals. In this embodiment, the first microporous layer 21 and the second microporous layer 31 contain a cerium compound (in this embodiment, cerium oxide). As a result, when the fuel cell is made to generate power, the cerium compound is gradually dissolved by the acid in the generated water to generate cerium ions, and the generated cerium ions move to the membrane electrode assembly 10. More specifically, the cerium compounds in the first microporous layer 21 and the second microporous layer 31 are a supply source of cerium ions to the membrane electrode assembly 10. With this configuration, because the cerium ions are supplied to the membrane electrode assembly 10 from the first microporous layer 21 and the second microporous layer 31, hydrogen peroxide radicals that are generated when the fuel cell generates power can be neutralized with the cerium ions. Therefore, the electrolyte membrane 12 can be prevented from breaking down (that is, from becoming thinner) due to hydrogen peroxide radicals.

According to the above-described embodiment, because the pre-calcination microporous layers 21T and 31T are formed of the microporous-layer-forming-ink that contains the cerium compound, the dispersing agent and water in the pre-calcination microporous layers 21T and 31T can be stably burnt off as a result of a catalytic reaction with the cerium compound when the first and second ink application diffusion layer substrates 20T and 30T are calcined. As a result, compared to a case in which the pre-calcination microporous layers do not contain the cerium compound, the pre-calcination microporous layers 21T and 31T can be calcined in a shorter time. With this configuration, the production rate of the membrane electrode gas diffusion layer assembly 100 can be prevented from reducing.

B. Modification Example

The present disclosure is not limited to the above-described embodiment and example, and may be implemented in the form of various embodiments within a scope that does not depart from the gist of the present disclosure. For example, the present disclosure may be modified as follows.

B-1. First Modification Example

In the above-described embodiment, the first microporous layer 21 and the second microporous layer 31 both contain the cerium compound, but at least one of the first microporous layer 21 and the second microporous layer 31 may contain the cerium compound. In addition, one of the first microporous layer 21 and the second microporous layer 31 may be omitted. Even with such a configuration, the eluted cerium ions are still supplied to the membrane electrode assembly 10, and therefore the hydrogen peroxide radicals that are generated when the fuel cell generates power can be stably neutralized with the cerium ions. As a result, the electrolyte membrane 12 can be prevented from breaking down (that is, from becoming thinner) due to the hydrogen peroxide radicals.

B-2. Second Modification Example

In the above-described embodiment, all of the electrolyte membrane 12, the anode catalyst layer 14, and the cathode catalyst layer 16 contain cerium ions, but at least one of the electrolyte membrane 12, the anode catalyst layer 14, and the cathode catalyst layer 16 may contain cerium ions. Even with such a configuration, the hydrogen peroxide radicals can be neutralized with the cerium ions in a state before the cerium ions sufficiently move from the microporous layers 21 and 31 to the membrane electrode assembly 10. In addition, in the above-described embodiment, the membrane electrode assembly 10 may not contain cerium ions when the membrane electrode assembly 10 is manufactured. Even with this configuration, the cerium ions eluted from the microporous layers 21 and 31 are supplied to the membrane electrode assembly 10, and therefore the hydrogen peroxide radicals that are generated when the fuel cell generates power can be stably neutralized with the cerium ions. As a result, the electrolyte membrane 12 can be prevented from breaking down (that is, from becoming thinner) due to the hydrogen peroxide radicals.

B-3. Third Modification Example

In the above-described embodiment, as a method of impregnating the electrolyte membrane 12 with cerium ions, there is given a method of applying a catalyst ink containing a cerium nitrate solution on the electrolyte membrane 12, but the method is not limited thereto. As a method of impregnating the electrolyte membrane 12 with cerium ions, for example, any of the following methods may be employed: (1) a method of obtaining the electrolyte membrane 12 by forming a cast film using a liquid obtained after mixing a soluble cerium compound in a dispersion of a polymer compound; (2) a method of immersing the electrolyte membrane 12 in a solution that contains cerium ions; and (3) a method of impregnating the electrolyte membrane 12 with cerium ions by causing a cerium organometallic complex salt to come into contact with a film made of a polymer compound.

The present disclosure is not limited to the above-described embodiments, examples, and modification examples, and may be implemented with various configurations without departing from the gist of the present disclosure. For example, technical features in embodiments, examples, and modification examples that correspond to those in various embodiments described in summary of disclosure may be replaced or combined as appropriate for the purpose of solving all or part of the above-mentioned problem, or achieving all or part of the above-mentioned effects. In addition, any technical features not described as necessary in the present specification may be omitted as appropriate. The present disclosure may be implemented by aspects described below.

(1) According to one aspect of the present disclosure, a membrane electrode gas diffusion layer assembly for a fuel cell is provided. This membrane electrode gas diffusion layer assembly includes a membrane electrode assembly that includes an electrolyte membrane, an anode catalyst layer joined to one surface of the electrolyte membrane, and a cathode catalyst layer joined to another surface of the electrolyte membrane; an anode diffusion layer joined to the anode catalyst layer of the membrane electrode assembly; and a cathode diffusion layer joined to the cathode catalyst layer of the membrane electrode assembly, in which at least one of the anode diffusion layer and the cathode diffusion layer includes a microporous layer that makes contact with the membrane electrode assembly, and the microporous layer contains a cerium compound. According to this aspect, through incorporating the cerium compound into the microporous layer, it is possible to stably burn off a dispersing agent and moisture in the microporous layer pre-calcination due to a catalytic reaction with the cerium compound that occurs when calcining the microporous layer pre-calcination. As a result, compared to a case in which the microporous layer does not contain the cerium compound, the microporous layer can be calcined in a shorter amount of time. In addition, when a fuel cell to which the membrane electrode gas diffusion layer assembly has been mounted generates power, the cerium compound in the microporous layer is eluted as cerium ions in generated water, which is a by-product of the power generation. With this configuration, because the eluted cerium ions are supplied to the membrane electrode assembly, hydrogen peroxide radicals that are generated when the fuel cell generates power can be stably neutralized with the cerium ions. As a result, it is possible to prevent the electrolyte membrane from breaking down (that is, from becoming thinner) due to the hydrogen peroxide radicals.

(2) In the above-mentioned aspect, at least one of the electrolyte membrane, the anode catalyst layer, and the cathode catalyst layer may contain cerium ions. According to this aspect, at least one of the electrolyte membrane, the anode catalyst layer, and the cathode catalyst layer contains the cerium ions. As a result, when a fuel cell to which the membrane electrode gas diffusion layer assembly is mounted starts to generate power, hydrogen peroxide radicals can be neutralized with the cerium ions before the cerium ions sufficiently move from the microporous layer to the membrane electrode assembly.

(3) According to one aspect of the present disclosure, a manufacturing method for a membrane electrode gas diffusion layer assembly for a fuel cell is provided. This manufacturing method includes the steps of (a) manufacturing a membrane electrode assembly by joining a catalyst layer to both surfaces of an electrolyte membrane; and (b) joining a diffusion layer to both surfaces of the membrane electrode assembly; in which the step (b) includes the steps of (b1) manufacturing an ink application diffusion layer substrate by applying a microporous-layer-forming-ink on a diffusion layer substrate to form a pre-calcination microporous layer on the diffusion layer substrate, the microporous-layer-forming-ink being formed by dispersing conductive particles, a dispersing agent, a hydrophobic substance, and a cerium compound in water; (b2) manufacture a diffusion layer in which a microporous layer is joined to the diffusion layer substrate by calcining the ink application diffusion layer substrate; and (b3) joining the diffusion layer to the catalyst layer in a state where the microporous layer faces the catalyst layer, in at least one of the two catalyst layers located on the both surfaces of an electrolyte membrane. According to this aspect, because the pre-calcination microporous layer is formed of the microporous-layer forming-ink that contains the cerium compound, it is possible to stably burn off a dispersing agent and moisture in the pre-calcination microporous layer due to a catalytic reaction with cerium compound that occurs when calcining the microporous layer pre-calcination. With this configuration, compared to a case in which the pre-calcination microporous layer does not contain the cerium compound, the pre-calcination microporous layer can be calcined in a shorter amount of time. In addition, when a fuel cell to which the manufactured membrane electrode gas diffusion layer assembly is mounted generates power, the cerium compound in the microporous layer is eluted as cerium ions in generated water that is generated due to the generation of power. As a result, because the eluted cerium ions are supplied to the membrane electrode assembly, hydrogen peroxide radicals that are generated when the fuel cell generates power can be stably neutralized with the cerium ions. As a result, the electrolyte membrane can be prevented from breaking down (that is, from becoming thinner) due to the hydrogen peroxide radicals.

(4) In the above-mentioned aspect, the step (a) may include a step of impregnating at least one of the electrolyte membrane, one catalyst layer of the two catalyst layers, and the other catalyst of the two catalyst layers with cerium ions. According to this aspect, at least one of the electrolyte membrane, the anode catalyst layer, and the cathode catalyst layer contains cerium ions. As a result, when a fuel cell to which the membrane electrode gas diffusion layer assembly is mounted starts to generate power, the hydrogen peroxide radicals can be neutralized with the cerium ions before the cerium ions sufficiently move from the microporous layer to the membrane electrode assembly.

The present disclosure can be implemented as the above-mentioned membrane electrode gas diffusion layer assembly (MEGA), a manufacturing method for the MEGA, a unit cell that includes the MEGA and separators disposed on either side of the MEGA that allow gas to flow, a fuel cell formed of a plurality of unit cells stacked on one another, or another type of technology.

What is claimed is:

1. A membrane electrode gas diffusion layer assembly for a fuel cell, the membrane electrode gas diffusion layer assembly comprising:
   a membrane electrode assembly comprising an electrolyte membrane, an anode catalyst layer joined to one surface of the electrolyte membrane, and a cathode catalyst layer joined to another surface of the electrolyte membrane;
   an anode diffusion layer joined to the anode catalyst layer of the membrane electrode assembly; and
   a cathode diffusion layer joined to the cathode catalyst layer of the membrane electrode assembly,
   wherein at least one of the anode diffusion layer and the cathode diffusion layer comprises a microporous layer that makes contact with the membrane electrode assembly,
   wherein the microporous layer comprises a cerium compound, and
   wherein at least one of the electrolyte membrane, the anode catalyst layer, and the cathode catalyst layer comprises cerium ions and a total molar content of cerium atoms in the microporous layer is from 10 to 500 times a total molar content of cerium atoms in the membrane electrode assembly when the membrane electrode gas diffusion layer assembly is in an initial state before being mounted to the fuel cell.

2. The membrane electrode gas diffusion layer assembly according to claim 1, wherein the anode catalyst layer, the cathode catalyst layer, or both, comprise the cerium compound.

3. The membrane electrode gas diffusion layer assembly according to claim 1, wherein the cerium compound comprises cerium nitrate.

4. The membrane electrode gas diffusion layer assembly according to claim 1, wherein the electrolyte membrane, the anode catalyst layer, and the cathode catalyst layer comprise cerium ions.

5. The membrane electrode gas diffusion layer assembly according to claim 1, wherein the cerium compound is not cerium oxide.

6. The membrane electrode gas diffusion layer assembly according to claim 1, wherein a molar ratio of cerium ions to sulfonic acid groups in the membrane electrode assembly is 0.1 mol % or more and 10 mol % or less.

* * * * *

UNITED STATES PATENT AND TRADEMARK OFFICE
CERTIFICATE OF CORRECTION

PATENT NO. : 10,916,780 B2
APPLICATION NO. : 15/962242
DATED : February 9, 2021
INVENTOR(S) : Junji Nakanishi et al.

Page 1 of 1

It is certified that error appears in the above-identified patent and that said Letters Patent is hereby corrected as shown below:

In the Specification

In Column 2, Line(s) 23, delete "(EGA)" and insert --(MEGA)--, therefor.

In Column 4, Line(s) 35, delete "fir" and insert --for--, therefor.

In Column 4, Line(s) 46, delete "sulfnic acid" and insert --sulfonic acid--, therefor.

In Column 6, Line(s) 61, delete "201" and insert --20T--, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*